H. HANSON.
WINDLASS BRAKE MECHANISM.
APPLICATION FILED JAN. 26, 1914.

1,140,374.

Patented May 25, 1915.
3 SHEETS—SHEET 1.

WITNESSES:

INVENTOR
Henry Hanson
BY
ATTORNEY

H. HANSON.
WINDLASS BRAKE MECHANISM.
APPLICATION FILED JAN. 26, 1914.

1,140,374.

Patented May 25, 1915.
3 SHEETS—SHEET 2.

WITNESSES:

INVENTOR
Henry Hanson,
BY
ATTORNEY

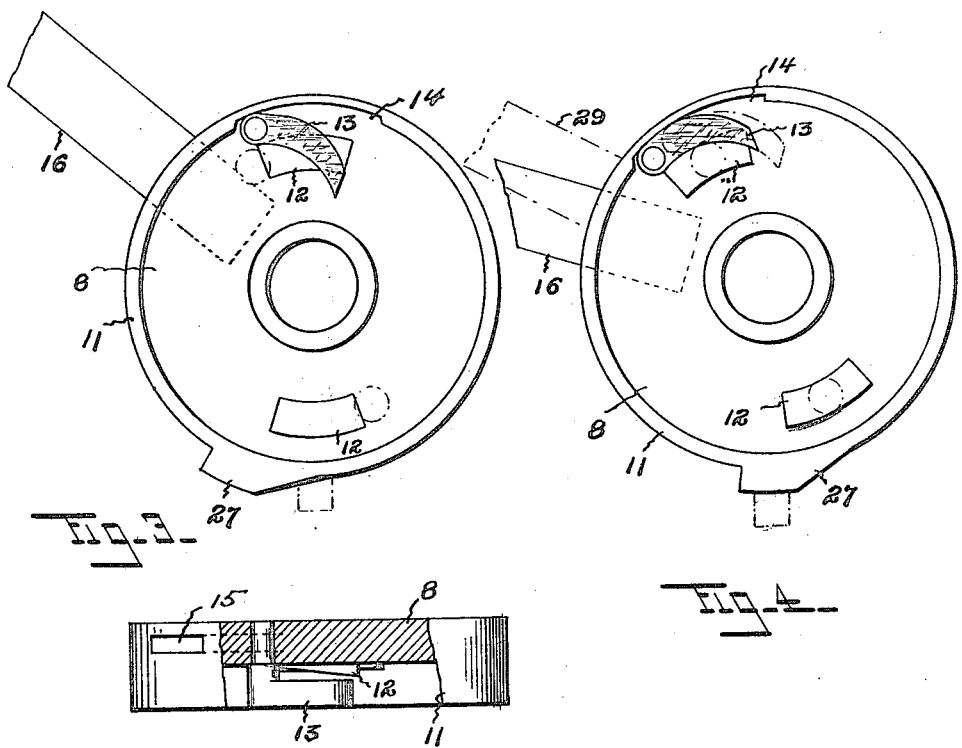

UNITED STATES PATENT OFFICE.

HENRY HANSON, OF MIDDLETOWN, CONNECTICUT.

WINDLASS BRAKE MECHANISM.

1,140,374.

Specification of Letters Patent.

Patented May 25, 1915.

Application filed January 26, 1914. Serial No. 814,356.

*To all whom it may concern:*

Be it known that I, HENRY HANSON, a citizen of the United States, residing at Middletown, in the county of Middlesex and State of Connecticut, have invented certain new and useful Improvements in Windlass Brake Mechanism, of which the following is a specification, reference being had therein to the accompanying drawings.

My invention relates to a new and improved windlass, referring more particularly to the brake mechanism thereof, and having for its object, among other things, to provide means controlled through the action of a single lever, whereby the drum will move under power in one direction, rotate freely in either direction, or be held against rotation in either direction, as desired.

With these principal objects in view, it is my further object to construct a windlass having the functions above described, with mechanism of such simple design that it may be assembled with little or no skill and capable of withstanding the hardest kind of usage from weather and unskilled operators and yet maintain its permanent efficiency.

To these, and other ends, my invention consists in the windlass, having certain details of construction and combinations of parts, as will be hereinafter described and more particularly pointed out in the claims.

Figure 1:
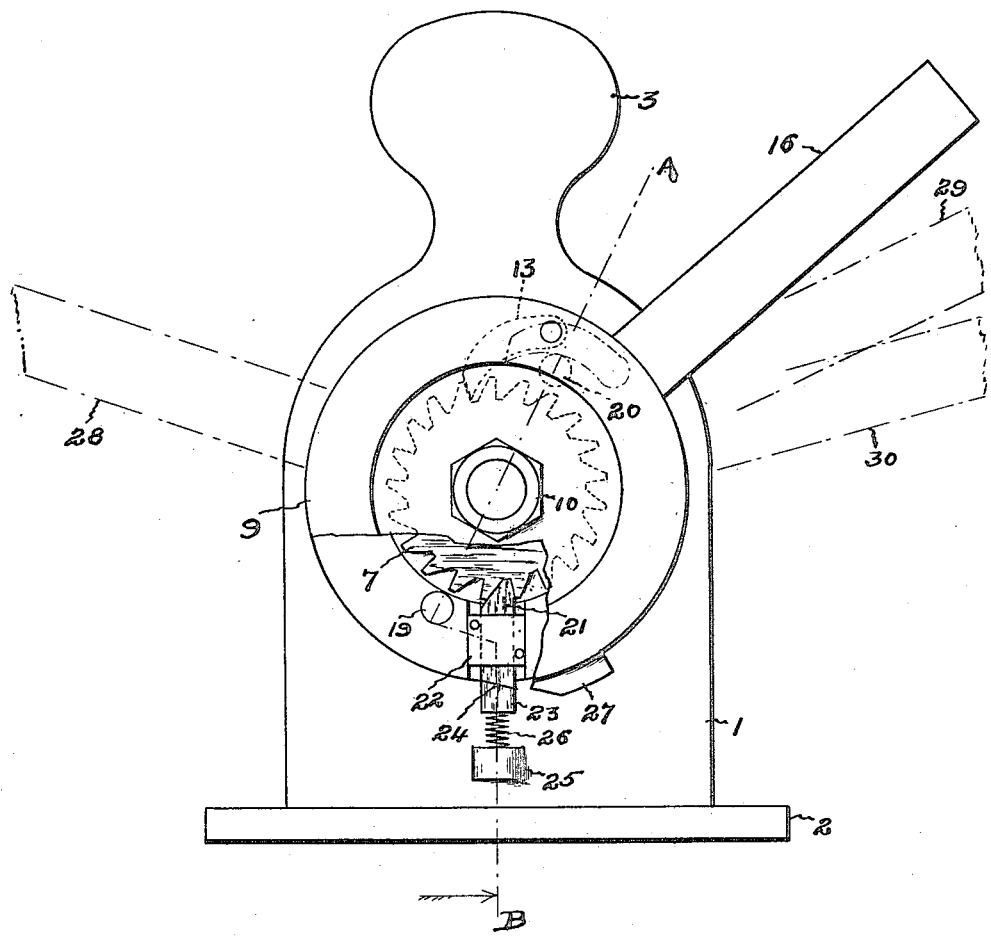
Figure 2:
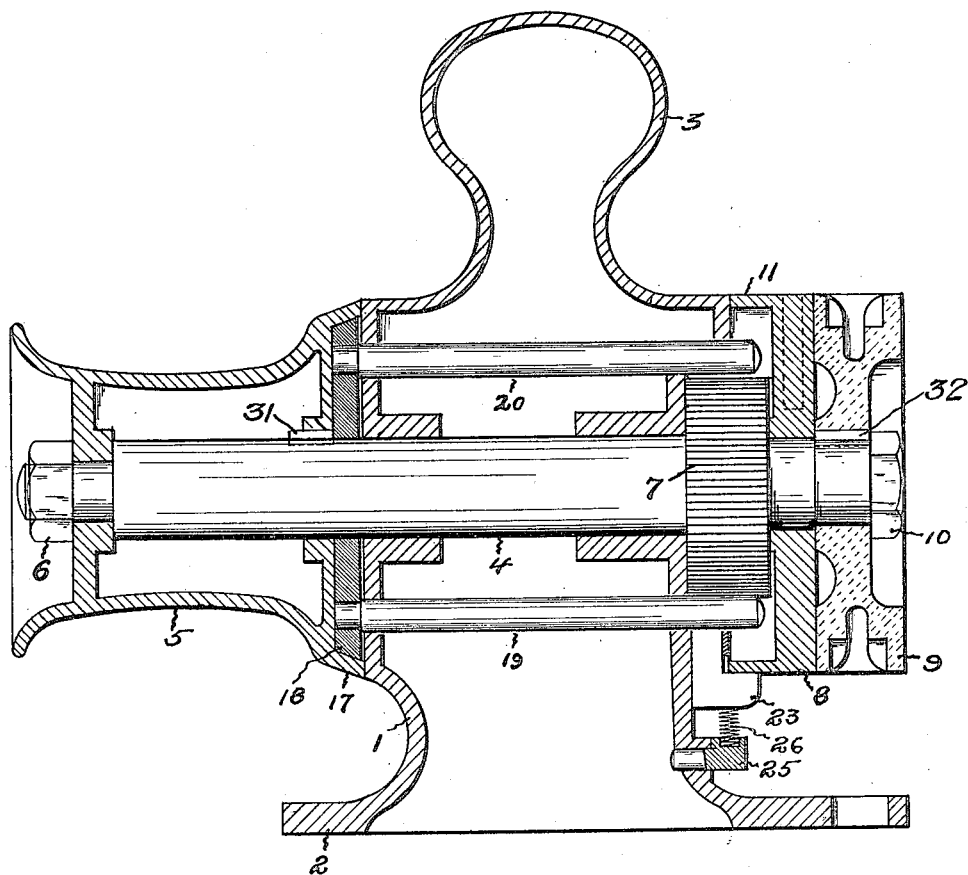

Referring to the drawings, in which like numerals of reference designate like parts in the several figures; Figure 1 is an end view of my improved windlass with a portion of the wild cat and heaving ring removed; Fig. 2 is a sectional view thereof upon line A—B of Fig. 1; Fig. 3 is an inside view of the heaving ring and pawl, showing the position of the parts when the pawl is in engagement with the teeth of the ratchet disk; Fig. 4 is a similar view of the heaving ring with the pawl and the parts in the brake position; and Fig. 5 is a fragmentary plan view of the heaving ring with the parts in the relative positions shown in Fig. 3.

In the practice of my invention, I provide a body member 1, which is preferably hollow to reduce the weight thereof, and having a base 2, by which it is permanently secured to the structure to which the windlass is attached, and terminating in its upper end in a bit 3. Rotatably mounted within this body member is a shaft 4, having a drum 5 fixed thereon by a key 31, or other similar means, and secured against endwise movement in one direction by the nut 6. Secured to said shaft upon the opposite side of the body member from the drum 5, is the ratchet disk 7, and rotatable thereon, between said ratchet disk and the wild cat 9, is the heaving ring 8. The wild cat 9 is secured to the shaft 4 by the key 32 and held against endwise movement by the nut 10. Said heaving ring is constructed with a laterally projecting flange 11 upon one side thereof, within which are the oppositely disposed cams 12 in the form of an inclined plane, as shown in Fig. 5. Pivotally mounted within said heaving ring, adjacent to one of the cams 12, is the heaving pawl 13, arranged so that the free end thereof engages the teeth of the ratchet disk 7. In the periphery of the heaving ring 8 is a socket 15 to receive one end of the lever 16, whereby means are provided for controlling the movement of said ring. The inner end of the drum 5 is provided with a flange 17, having an angular inner face, and within which is mounted the brake disk 18, which is fixed on the end of the rods 19 and 20 that are movably mounted within the body member 1, so that their free ends project through the opposite side of the body member and into the path of the cams 12.

Movably mounted in the body member is a stop pawl 21, which is held against lateral movement by a plate 22, and provided with a head 23 at its lower end, having a cam face 24 thereon. Fixed in the body member, opposite the stop pawl 21, is a lug 25, between which and the pawl 23 is a spring 26 which exerts its tension so as to force the pawl 21 upwardly, whereby it may maintain a constant engagement with the teeth in the ratchet disk. Upon the outer edge of the heaving ring 8 is a cam 27 which moves in the path of the head 23 upon the pawl 21 and pulls the pawl out of engagement with the teeth of the ratchet disk. The lug 25 may be made integral with the body member or the wild cat 9 integral with the drum 5, if desired, as is usual in many types of windlasses, and in other details my invention may be very materially modified without departing from the essentials thereof.

When the several parts are in the zero position, shown in Fig. 1, with the lever 16 in full lines, the drum is held against rotation in one direction by the stop pawl 21 engaging the teeth in the ratchet disk, and the heaving pawl 13 is also in engagement therewith. To rotate the drum and raise the chain or rope that may be connected therewith, the lever 16 is moved to its extreme forward position, indicated by the broken lines 28 in Fig. 1, at which time the pawl 13 will contact with the end of the rod 19. During the movement of the lever between the positions above described, the shaft 4, and drum 5 connected therewith, are rotated through the engagement of the pawl 13 with the teeth in the ratchet disk 7, the stop pawl 21 being forced out of its engagement with the teeth against the spring 26. While the lever 16 and heaving pawl 13 are being returned to the zero position, the stop pawl 21 prevents the return movement of the shaft and drum. If it is desired to allow the drum to run free in the opposite direction so that the rope or chain may run out therefrom, the lever is moved to the position indicated by broken lines 29 in Fig. 1, and the heaving pawl 13, by its engagement with the free end of the rod 20, is lifted out of its engagement with the ratchet disk and the cam 27 has engaged the cam face 24 upon the stop pawl 21 and withdrawn the same from its engagement with the teeth in said ratchet disk. The drum is now free to rotate in either direction, but in use the pull upon the chain or rope usually causes it to rotate in the direction opposite to that given by the heaving pawl. To stop the drum the brake mechanism is operated, which consists in shifting the lever 16 to the position shown by broken lines 30 in Fig. 1, at which time the pawl 13, by reason of its engagement with the rod 20, is forced outwardly so that it engages the inside of the flange of the heaving ring 8 adjacent to the recess 14, and holds the heaving disk from further rotation in that direction. While being moved to this position the cams 12 within the heaving ring engage the ends of the rods 19 and 20 and move them endwise through the body member, thereby forcing the peripheral face of the disk 18 against the angular inner face of the flange 17, the friction thereby caused being sufficient to almost instantly stop the drum against rotation. The cam 27 during this action retains its engagement with the head of the stop pawl 21. These operations are repeated by manipulation of the lever 16 as desired. In Fig. 3 I have illustrated the relative position of the cams connected with the heaving ring, the heaving pawl, stop pawl and lever when in their zero position. In Fig. 4 the full lines illustrate these same parts when the brake mechanism is in operation, and the position of the heaving pawl and lever are illustrated by broken lines when the drum is capable of free rotation.

With the device as herein described, the required mechanism is very simple and compact, being so arranged as to be readily assembled and capable of withstanding very rough usage, and is manipulated with a single lever, the relative positions of which determine the action or non-action of the drum and wild cat.

Within the spirit of my invention minor changes and alterations can be made, aside from those above indicated, and I would therefore have it understood that I do not limit myself to the exact construction herein shown and described, but claim all that falls fairly within the limitation of the appended claims.

Having described my invention, what I claim as new and desire to secure by Letters Patent, is:—

1. In a windlass, the combination with a body member; of a shaft rotatably mounted therein; a drum fixed to said shaft and held against endwise movement thereon; a ratchet disk connected with said shaft; a heaving ring rotatably mounted upon said shaft and held against endwise movement; a pawl connected with said heaving ring and having engagement with the teeth in said ratchet disk; and brake mechanism for holding the said drum against rotation, having a part that engages the inner end of said drum and actuated from the said heaving ring in a line parallel with said shaft.

2. In a windlass, the combination with a body member; of a shaft rotatably mounted therein; a drum fixed to said shaft and held against endwise movement; a ratchet disk connected with said shaft; a heaving ring rotatably mounted upon said shaft and held against endwise movement; a pawl connected therewith and engaging the teeth of said ratchet disk; brake means having connection at one end with said drum and actuated by said heaving ring in a line parallel with said shaft; and means for holding said pawl out of engagement with said ratchet disk while said brake mechanism is being operated.

3. In a windlass, the combination with a body member; of a shaft rotatably mounted therein; a drum fixed to said shaft and held against endwise movement in relation to said body member; a brake disk at the inner end of said drum; one or more members connected with said brake disk and projecting through the opposite side of said body member; a ratchet disk fixed to said shaft; a heaving ring rotatably mounted upon said shaft, having cams thereon corresponding in number with said members; a pawl connected with said heaving ring and engaging the teeth in said ratchet disk and means for moving said pawl out of engagement with the teeth in said ratchet disk, the relative location of the mounting of said pawl and the said cams being such that the said pawl is out of engagement with said ratchet disk while said cams are in engagement with said members.

In testimony whereof I affix my signature in presence of two witnesses.

HENRY HANSON.

Witnesses:
 GEORGE E. HALL,
 FLORENCE H. MONK.

Copies of this patent may be obtained for five cents each, by addressing the "Commissioner of Patents, Washington, D. C."